(12) United States Patent
Daniels, Jr. et al.

(10) Patent No.: US 7,693,839 B2
(45) Date of Patent: Apr. 6, 2010

(54) SYSTEM AND METHOD FOR OBTAINING AND TRACKING UP-TO THE-MINUTE DELIVERY LOCATIONS OF EMPLOYEES VIA A DATABASE SYSTEM

(75) Inventors: Edward P. Daniels, Jr., Trumbull, CT (US); Elissavet Soutloglou, Harlow-Essex (GB); James M. Valovich, Bridgeport, CT (US); Yuecheng Meng, Orange, CT (US); Kevin L. Strobel, Fairfield, CT (US); Michael A. Gagliardi, Plantsville, CT (US); Kevin W. Bodie, Brookfield, CT (US)

(73) Assignee: Pitney Bowes Inc., Stamford, CT (US)

( * ) Notice: Subject to any disclaimer, the term of this patent is extended or adjusted under 35 U.S.C. 154(b) by 2041 days.

(21) Appl. No.: 09/862,377

(22) Filed: May 22, 2001

(65) Prior Publication Data

US 2002/0178168 A1 Nov. 28, 2002

(51) Int. Cl.
 *G06F 17/00* (2006.01)
 *G06F 17/30* (2006.01)
 *G06F 15/16* (2006.01)

(52) U.S. Cl. .................... 707/10; 707/104.1; 707/201; 709/203

(58) Field of Classification Search ............ 707/1, 707/10, 102, 104.1, 201; 709/206, 245, 203, 709/246, 204, 238, 217–224; 455/456.1; 705/8

See application file for complete search history.

(56) References Cited

U.S. PATENT DOCUMENTS

| | | | | |
|---|---|---|---|---|
| 5,493,692 A * | 2/1996 | Theimer et al. | ............ | 455/26.1 |
| 5,648,916 A * | 7/1997 | Manduley | ............ | 700/90 |
| 5,673,256 A * | 9/1997 | Maine | ............ | 370/271 |
| 5,793,972 A * | 8/1998 | Shane | ............ | 709/219 |
| 5,805,810 A * | 9/1998 | Maxwell | ............ | 709/206 |
| 5,812,865 A * | 9/1998 | Theimer et al. | ............ | 709/228 |
| 5,905,777 A * | 5/1999 | Foladare et al. | ............ | 379/90.01 |
| 6,101,320 A * | 8/2000 | Schuetze et al. | ............ | 709/206 |
| 6,156,988 A * | 12/2000 | Baker | ............ | 209/584 |
| 6,157,945 A * | 12/2000 | Balma et al. | ............ | 709/206 |
| 6,175,859 B1 * | 1/2001 | Mohler | ............ | 709/206 |
| 6,212,552 B1 * | 4/2001 | Biliris et al. | ............ | 709/206 |
| 6,263,201 B1 * | 7/2001 | Hashimoto et al. | ............ | 455/403 |
| 6,333,919 B2 * | 12/2001 | Gaffney | ............ | 370/254 |
| 6,363,414 B1 * | 3/2002 | Nicholls et al. | ............ | 709/206 |
| 6,397,223 B1 * | 5/2002 | Kori | ............ | 707/102 |
| 6,438,584 B1 * | 8/2002 | Powers | ............ | 709/206 |
| 6,446,115 B2 * | 9/2002 | Powers | ............ | 709/206 |
| 6,460,073 B1 * | 10/2002 | Asakura | ............ | 709/206 |
| 6,463,462 B1 * | 10/2002 | Smith et al. | ............ | 709/206 |

(Continued)

*Primary Examiner*—Miranda Le
(74) *Attorney, Agent, or Firm*—Christopher H. Kirkman; Angelo N. Chaclas

(57) ABSTRACT

This present invention is a method and system for providing an up-to-the-minute location of a recipient for delivery of a message. A computerized system imports corporation databases containing employee location codes and delivery preference information (as well as addresses for various message media such as FAX telephone numbers, E-mail addresses, Pager telephone Numbers, etc.) to a database in or accessible by the corporation's Mail Room. The system includes WEB-based and telephone access to this information to allow employees to keep this information up to date.

8 Claims, 2 Drawing Sheets

U.S. PATENT DOCUMENTS

| | | |
|---|---|---|
| 6,580,787 B1 * | 6/2003 | Akhteruzzaman et al. ............ 379/88.22 |
| 6,618,763 B1 * | 9/2003 | Steinberg ............ 709/246 |
| 6,687,362 B1 * | 2/2004 | Lindquist et al. ....... 379/218.01 |
| 6,732,080 B1 * | 5/2004 | Blants ............ 705/9 |
| 7,062,474 B1 * | 6/2006 | Reiter ............ 705/408 |
| 7,092,502 B2 * | 8/2006 | Mohn et al. ............ 379/201.01 |
| 7,124,087 B1 * | 10/2006 | Rodriguez et al. ............ 705/1 |
| 7,222,081 B1 * | 5/2007 | Sone ............ 705/7 |
| 2001/0034849 A1 * | 10/2001 | Powers ............ 713/202 |
| 2002/0007421 A1 * | 1/2002 | Dixon et al. ............ 709/238 |
| 2002/0025798 A1 * | 2/2002 | Titmuss et al. ............ 455/412 |
| 2002/0031210 A1 * | 3/2002 | Mohn et al. ............ 379/114.01 |
| 2002/0044067 A1 * | 4/2002 | Ilcisin ............ 340/825.49 |
| 2002/0103932 A1 * | 8/2002 | Bilbrey et al. ............ 709/245 |
| 2004/0122730 A1 * | 6/2004 | Tucciarone et al. ............ 705/14 |

* cited by examiner ated to be "always" up to date) will be imported on a
SYSTEM AND METHOD FOR OBTAINING AND TRACKING UP-татUP-TO THE-MINUTE DELIVERY LOCATIONS OF EMPLOYEES VIA A DATABASE SYSTEM

FIELD OF THE INVENTION

The subject invention relates to a computer program system for tracking the location of employees to facilitate the delivery of messages or parcels. The system allows for continuous updating of employee locations to provide an up-to-the-minute location of predetermined employees.

BACKGROUND OF THE INVENTION

Timely delivery of messages or parcels is complicated by recipients with jobs that require that they move around during the day. For large corporations which have thousands of employees, relocated employees to new offices can delay the delivery of a package internally for a greater amount of time than it took for the package to be delivered to the corporation. Heretofore an enterprise would have to hire a person, usually referred to as an Administrative Assistant, to keep track of employee locations to assist in the delivery of messages or parcels throughout the day. Tracking employee locations requires a great deal of communication between the administrative assistant and the employee being monitored. Accordingly, the ratio of administrative assistants to people must be small. Often, only the highest level managers are tracked and the others are virtually ignored. Aside from the hour-to-hour whereabouts of employees, the manual method was unacceptably slow in notifying the Mail Room of changes of office locations of people.

It is expected that the corporation database (which is presumed to be "always" up to date) will be imported on a periodic basis so that the database for this system may be kept up to date. Savvy corporations may also use this system's database to update the corporation database. Existing manual methods for keeping the Mail Room up to date on employee or location changes are cumbersome and inherently slow, which means the information in the Mail Room is almost always out of date. This database should be able to be as up to date as the corporation's database. The reduced need for administrative assistants to perform this activity should allow them to focus on more appropriate tasks.

Accordingly, a need exists for a computerized system for tracking the location of employees wherein a computer program keeps track of all of the employee locations and employee preferences concerning message delivery throughout the day to facilitate delivery of messages in a timely manner.

SUMMARY OF THE INVENTION

The present invention provides a method and a computer system for locating a recipient of a message in a corporation. The recipient is likely to be an employee of the corporation but it could be anyone who has provided their personal information, contact information, and location to the corporation, and who further has access to the computer based system of the present invention in order to update their schedule and delivery preferences. This computer based system is capable of including all employees of a large corporation as potential recipients being tracked by the system. The method for locating a recipient of a message in a corporation using a computer based system involves compiling a database(s) of recipient's scheduled locations, recipient delivery preferences and the corporation's preferences. Access to the recipient location and delivery preferences database is provided to the recipients and the system administrator who can then update the recipient's scheduled locations and/or delivery preferences. Optionally, the recipient is provided access to the corporation schedule organizer and can update recipient's schedule in the corporate schedule organizer. The corporate schedule organizer is monitored for location change(s) in the recipients schedule and any location changes in the schedule are updated into the employee location and delivery preference database. Finally, access to the updated schedule location and delivery preferences is provided to facilitate the delivery of the message to the recipient in a timely manner.

The present invention further provides a computer system involving a module to compile a database containing recipient's scheduled locations, the recipient's delivery preferences and the corporation's preferences and the compiled database. A component provides access to the database for the recipients and the system administrator. An editing module allows the recipient or system administrator to update the recipient's scheduled locations and preferences. Alternatively, a component provides access to the corporation's schedule organizer and which allows the recipient to update the recipient's scheduled location(s) in the corporate schedule organizer. A module monitors corporate schedule organizer for location change(s) in the recipients schedule and updates the employee location database with the schedule location changes. Finally, a component provides access to updated schedule(s) to facilitate delivery of a message to recipient at the updated scheduled location.

DETAILED DESCRIPTION OF THE PREFERRED EMBODIMENTS

This subject invention consists of several parts and will be capable of operating in both incoming message and/or outgoing message environments required by the Enterprise, as described below in conjunction with FIGS. 1 and 2.

Hardware Overview

Figure 1:
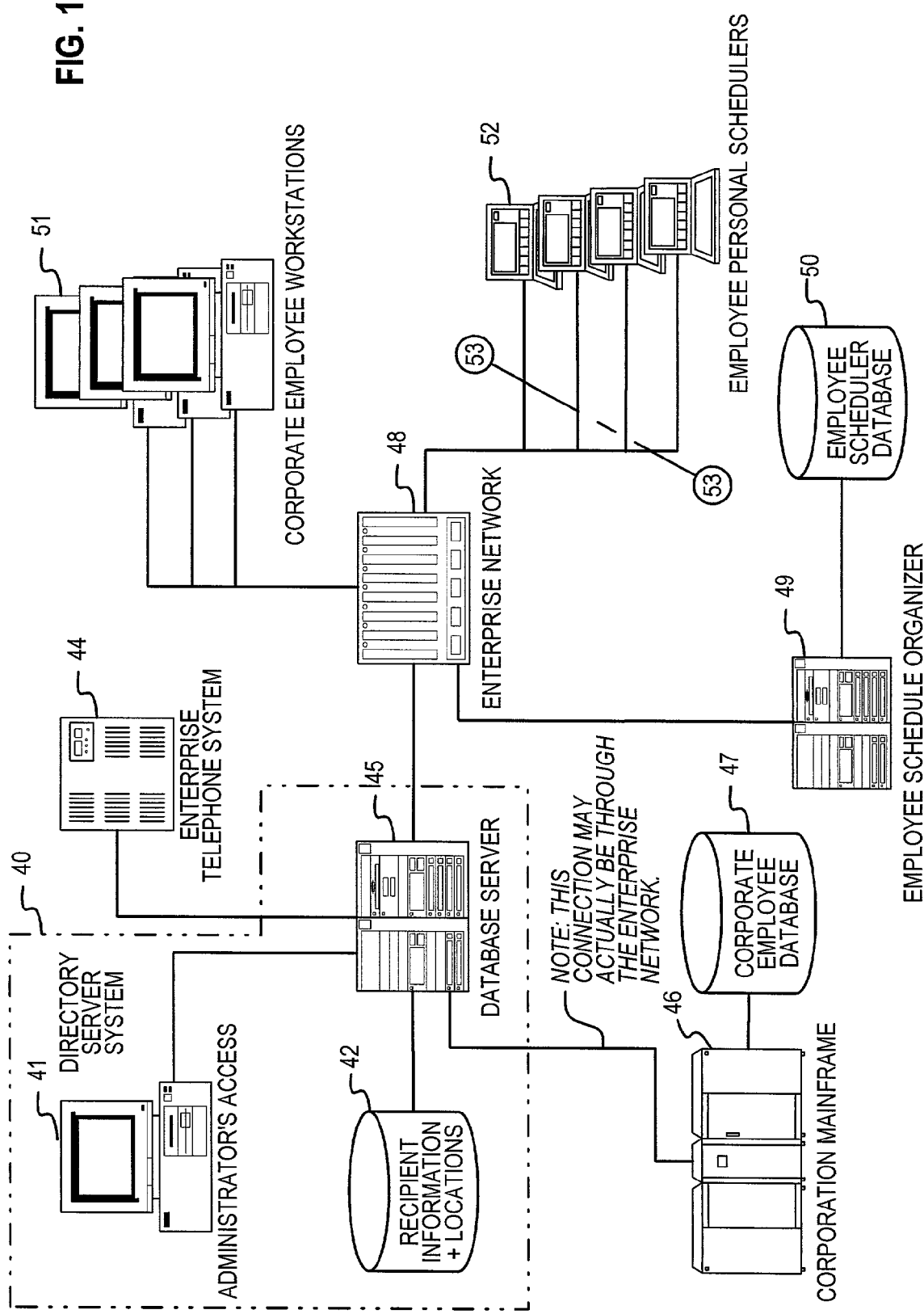
FIG. 1 is a block diagram that illustrates a computer hardware system employing an embodiment of the subject invention.

FIG. 1 is a block diagram that illustrates a computer hardware system employing an embodiment of the subject invention. The directory server system hardware 40 embodies a database server 45 maintaining the recipient information and location database 42. Typical hardware database servers 45 and database(s) 42 are Compaq™, Dell™, or equivalent servers running Microsoft Windows NT™ (or Windows 2000) Operating System. Alternatively, the servers may be Sun™, Hewlett-Packard™, or other systems running the Sun Solaris™, HP-UX™, or equivalent Unix Operating System. The Database(s) themselves can be implemented on a Oracle™, Microsoft Access™, or equivalent database engine as appropriate for the operating system used by the hardware selected. If this application is deployed on a Microsoft Windows™-based systems, this application will require a web-server application such as Microsoft IIS (Internet Information Services) and on Unix systems, a web-server application such as Sun's Java Runtime Environment (JRE).

The database server 45 is connected to the administrators console 41 which can be a separate personal computer which is used generically and refers to present and future microprocessing systems. Typical microprocessors are Compaq™, Dell™ or equivalent PC systems running the Microsoft Windows NT™ (or Windows 2000) Operating System. The administrative console is a Browser-based application which would require either the Microsoft Internet Explorer™, the Netscape Navigator™ or equivalent browser in order to run it. Since the Administrative console is a browser-based application, a Sun™, said console requires a Hewlett-Packard™ or equivalent computer running the Solaris™, HP-UX™, or equivalent Unix operating system with a browser designed to work with the selected operating system. In all cases, the browser being used must include the Sun™ Java "plug-in" software in order to interpret the Java language code. The database server 45 interfaces 15 with the corporate mainframe(s) in order to import employee location data and employee general information from the corporate employee database 47. The corporation mainframe 46 may be, for example, a IBM™ Risc, AS400, or similar mainframe, or equivalent Hewlett-Packard™ Mini-Computer and the corporate employee database 47 may be, for example, a Oracle Database™, or DB2™ Database supplied by IBM™.

Because the system requires that employees/recipients modify their schedules and delivery preferences on the system as said schedules and preferences change, database server 45 interfaces with the corporation's enterprise telephone system 44 via the enterprise telephone system interface 17. The enterprise telephone system interface could be, for example, iConnectMail manufactured by connected systems, Santa Barbara, Calif., or an equivalent telephone switching vendor. Another avenue whereby the database server is made accessible to recipients is through the database server's 45 link to the enterprise network 48. Typical network systems are Ethernet or Token Ring based and are implemented by a number of vendors, including Cisco™. Corporate employee workstations 51 are linked to the corporate network 48. Corporate workstations 51 are well known in the art. A few examples are Compaq Presario™, Dell Dimension™, and IBM Thinkpad™. Furthermore, employees can use their employee personal schedulers 52, such as Palm Pilot, Lotus Notes™, or equivalent software-based schedulers, to update their schedules via a link to the enterprise network 48. Personal schedulers 52 may be connected via IR Links, RF links, the employee's workstation or some other means.

Furthermore, the enterprise network 48 is connected to the employee schedule organizer 49, which is linked to and maintains the schedules of the employees in the employee scheduler database 50. Examples of schedule organizers are Lotus Notes™ or Meeting Maker™. The scheduler database 50 may be, for example, the proprietary databases of the schedule manufacturers or a custom-designed database which interfaces to the proprietary database through an API provided by the scheduler manufacturer. Also, the enterprise network 48 may be linked to the corporation mainframe 46. Should such a link exist, the administrator could update and import employee locations and information in the directory server system 40 through the network 48 instead requiring a direct connection.

Software Overview

Figure 2:
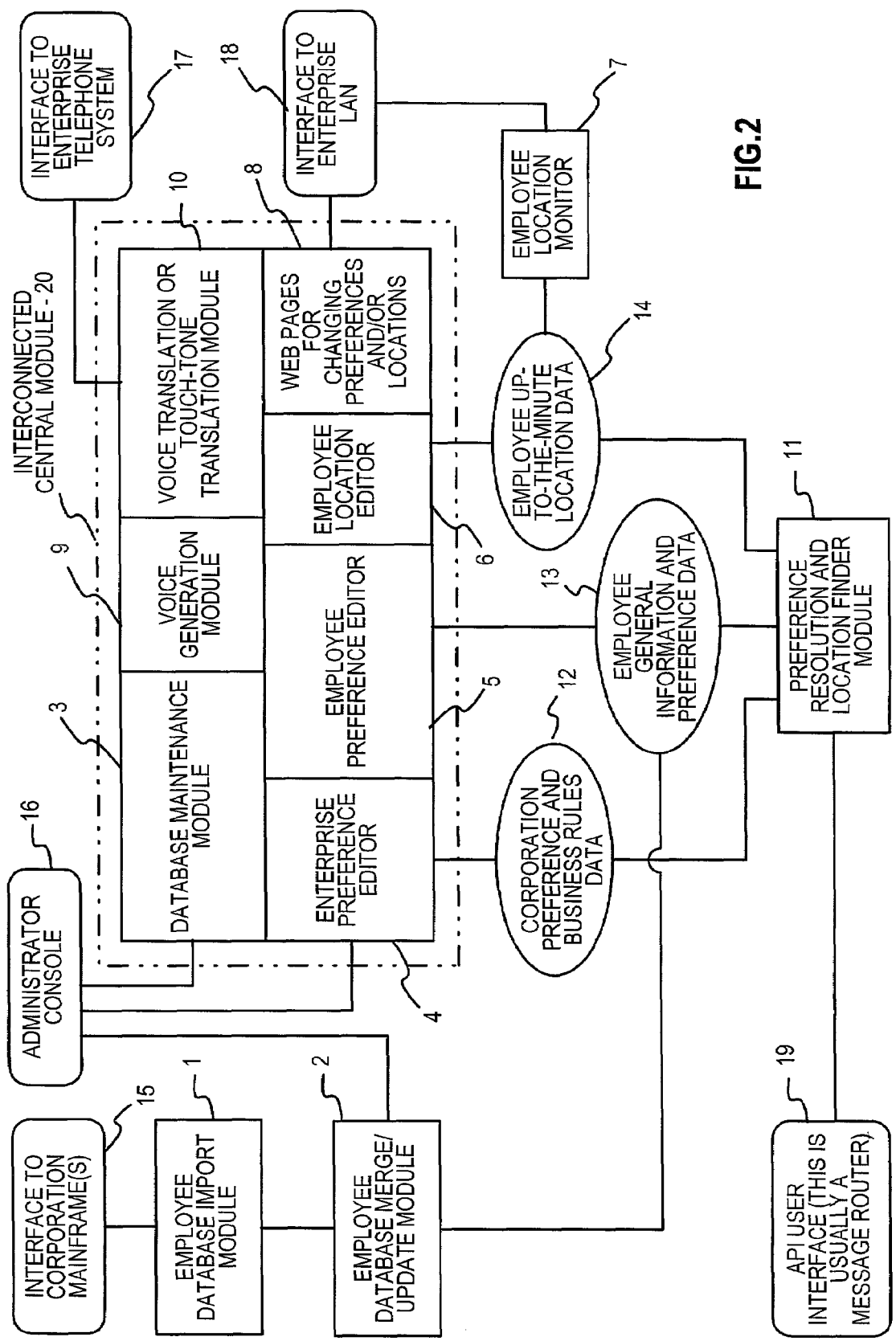
FIG. 2 is an upper level software logic block diagram of the computer program employed with the present invention.

FIG. 2 is the upper level software logic diagram. The relationships of the required software needed to practice the subject invention are described in greater detail in the following.

The Java programming language is the primary language of implementation; therefore, this application will be virtually platform-independent. By that, we mean that the application will run, without modification (other than re-compilation, perhaps) on either Microsoft Windows-based systems as well as Unix-based systems.

In reference to FIGS. 1 and 2, the system administrator must first import the recipient locations data and general recipient information data from the corporate employee database 47 to the recipient information and locations database 42 connected to the database server 45 by accessing the corporation mainframe 46 via a connection between the database server 45 and the corporation mainframe 46 or via the enterprise network 48 (which connects to both the database server 45 and the corporation mainframe 46). If the database server 45 is directly linked to the corporation mainframe 46, an interface to the corporation mainframe 15 will be required. Examples of such interfaces are usually proprietary to the scheduler manufacturer but usually manifest themselves in the form of a base or holder for the hand-held scheduler hardware which, when the hand-held scheduler is positioned correctly in the base, will allow the device to communicate with the desktop computer through proprietary software installed on the desktop machine. Interfacing with the corporation mainframe 15 is the employee database import module 1, which is responsible for transferring the employee database information required by this system from the corporation mainframe 46. It will accept information periodically from the corporation mainframe 46 and upon request of the system administrator. Employee database import modules may be, for example, implemented using custom software, which would utilize the proprietary API of the database for locating, retrieving and updating the information from the corporate mainframe database.

Linked to the import module 1 is the employee database merge/update module 2 which takes the information from the corporation mainframe 46 and converts it to the format used by the system's recipient information and locations database 42 which contains the employee general information and preference data 13, employee up-to-the-minute location data 14, and corporation preference and business rules data 12. In addition, employee database merge/update module 2 must merge the incoming data with the existing employee general information preference data 13 such that no existing data is lost, and data updated manually does not get overwritten by the incorrect prior information. All conflicts are reported by the employee database merge/update module 2 to the administrator 16, 41. Software which can be used to create the employee database merge/update module 2 are the Java, C++, or equivalent programming language in a version appropriate for the operating system of the computer hardware being used.

The employee general information and preference data 13 in the recipient information and locations database 42 is updated periodically from the corporate employee database 47. It will contain name and address information for the employees using the recipient information and locations database 42. In addition to physical addresses, each employee's E-mail address, FAX telephone number, office location, mail stop, and other assigned "addresses" are included in the employee general information and preference data 13. There will also be information in the employee general information and preference data 13 for each employee regarding who their supervisor is, who their secretary is, and additionally, lists of people each employee gets messages from. Furthermore, the employee general information and preference data 13 includes information for each recipient indicating what priority should be used to deliver messages from specific people. If the database of the corporation does not or cannot be modified to contain these types of preference information, a custom database will have to be created and maintained to hold this information. Presumably, the custom database would be linked to the corporation database and the invention would use the two of them together as if they were one.

Administration of the System.

The administrator can backup, maintain, fix and edit the system from the administrator console 16 and administrator's access 41. The administrator console 16 and administrator's access 41 are linked to the database server 45 which contains all of the software editors and modules of the subject invention (see FIGS. 1 and 2). The administrator console 16 and administrator's access 41 are in communication with an interconnected central module 20 which includes: the database maintenance module 3, enterprise preference editor 4, employee preference editor 5, employee location editor 6, web pages for changing preferences and or locations 8, voice generation module 9, and voice translation or touch-tone translation module 10. Administrators will have privileges to access all areas of the software and databases supporting the directory server system 40 (see FIG. 2). The primary ongoing activity of the administrator will be to backup, maintain and fix errors in any of the databases within the system, add, delete and otherwise maintain user accounts.

Initially and from time to time thereafter, an administrator will use the enterprise preference editor 4 to keep the business rules and preferences (which would apply to all employees) up to date. Software for creating an enterprise preference editor 4 includes Java, Microsoft C++ or other programming language as appropriate for the operating system being used. These rules/preferences may include whether fax transmissions may be made after business hours, or whether certain level employees may authorize express mail transactions. For example, delivery preferences allow a person to determine, for incoming messages, what format/media the message should be delivered on regardless of how it was sent. (There are certain overrides that a sender may invoke, which would affect the actual delivery format/media used.) Messages will only be converted to the "output" or "delivery" media at the latest possible time to avoid possibly translating a message many times in the process as a recipient's preferences change. For outgoing messages, the enterprise preferences editor 4 suggests how (i.e., in what format using what media) a message should be delivered to its intended recipient. Some preferences may be set up as "mandatory preferences" which cannot be overridden by the recipient. Delivery preferences are not limited to format and/or media. Delivery preferences may also include the time of day that a message should be sent, whether it is urgent or not, and others. Finally, delivery preferences may include "cascading" instructions. Allowing preferences to "cascade" or apply in a strict sequence, provides added convenience to the employees. For instance, an employee may set a preference to get all fax messages via E-mail instead. Later, the employee is expecting a fax which is needed for a meeting. The employee may add a preference that, for a specific period of time, fax messages should be delivered as E-mail messages. The preference resolver will first apply the overall preference (that faxes be converted to E-Mail) and then apply the time-based preference which would negate that. The result would be the fax would be delivered as an E-mail if it were within the time period. Once a preference "expires" (i.e. passes the time for which it is valid), it is deleted from the database to avoid unnecessary computation by the preference resolver.

The administrator will use the database maintenance module 3 to set up, configure, and maintain the system. Database maintenance module 3 can be created from the Java, C++ or similar programming language software.

All of the business-suggested rules and preferences that the system must abide by are stored in the corporation preference and business rules data 12 in the recipient information and locations database 42 which is linked to the enterprise preference editor 4 so that the administrator can maintain and update this database.

Recipient/Employee Scheduling, Location, and Preference Updates

Referring to FIG. 1, in order for the present invention to operate, the employees or recipients must be able to update their schedules and alter their delivery preferences. Employees can alter their schedules in two manners. They can either access the directory server system 40 by enterprise telephone system 44 or by the enterprise network 48 which links their employee personal schedulers 52 or corporate employee workstations 51. Alternatively, employees can alter their schedule in the employee scheduler database 50 via the enterprise network 48, and the directory server system 40 will monitor changes made to the employee scheduler database 50 and update those changes into the employee up-to-the-minute location data 14 in the directory server system 40.

The following software facilitates an employee's alteration of their schedule and preferences by directly accessing the directory server system 40. When an employee telephones the directory server system 40, the voice translation or touch-tone translation module 10—through the interface to enterprise telephone system 17, presents the instructions to the employee and receives the responses from the employee in a manner consistent with the capabilities of the telephone connection so that an employee can update information by telephone. This may be by spoken menus to which the user presses keys on the telephone keypad to respond, or by spoken menus to which the user responds with spoken words that are translated into machine-readable responses. A corporation may decide to implement only a "touch-tone" response system, or a "voice response" system, or both, depending upon their needs. This will be a method that employees may easily use while not in the office to update their whereabouts information. In order for the telephone interface to have any value, it must be capable of translating menu options, instructions, error messages and other information in a format that the telephone is capable of transmitting. The voice generation module 9 is in communication with the voice translation or touch-tone translation module 10 and is responsible for converting the necessary item to a format usable over the telephone. Voice translation or touch-tone translation module 10 and voice generation module 9 may be, for example, Impact Voice Mail Server supported by Voice C++/Active software and supplied by Black Ice Software™ Inc.

When an employee accesses the directory server system 40 via the enterprise network 48, web pages for changing preferences and/or locations 8, which contains all code and scripts necessary, checks the authenticity and authority of an employee attempting to log in through the interface to enterprise LAN 18 to the enterprise network 48. If the user has the proper authority or privilege, web pages for changing preferences and/or locations 8 will transfer control to the module which will actually perform the desired operation. A major part of this interface is involved with translating the various preferences, their valid date ranges, their priorities and other attributes to a visually-coherent display that is understandable by the users. Additionally, the interface also allows a user to succinctly and unambiguously enter delivery locations, media selections, and delivery time periods for use by the system. Web page code and scripts for security and transfer to other software modules that can be used include SSL (Secure Socket Layer) transmission protocol and/or various data encryption techniques.

After an employee has accessed the directory server system 40 by telephone or LAN, they can now utilize the employee location editor 6 and employee preference editor 5 which are connected with the web pages for changing preferences and/or locations 8 as well as voice generation module 9 and voice translation or touch-tone translation module 10 in the interconnected central module 20 (see FIG. 2). The employee location editor 6 is linked to the employee up-to-the-minute location data 14 in the recipient information and locations database 42. Employees use the employee location editor 6 to update their employee up-to-the-minute location data 14 stored in the recipient information and locations database 42. Remote access to the employee location editor 6 is crucial if the employee is out of the office and needs to alter their location. The employee up-to-the-minute location data 14 contains information as to where employees receiving urgent mail or employees selecting to have their mail follow them to their scheduled locations are scheduled to be during each day and what media should be used to transmit their incoming messages. Employee location editor 6 can be created with software programming languages such as Java, Microsoft C++ or others as appropriate for the operating system involved. The employee preference editor 5 is used by both the administrator and the employees. The employee preference editor 5 is linked to the employee general information and preference data 13 contained in the recipient information and locations database 42 and modifies the employee preferences and general information therein. The administrators will have access to all preferences and addresses stored by the system. Employees may be limited in their access to their preference information based on the corporation preference and business rules data 12 in the recipient information and locations database 42. Unlike the enterprise preferences in the corporation preference and business rules data 12, which are primarily edited by the enterprise preference editor and accessible by only the administrator, the employee preference editor 5 will be able to be accessed by a WEB page on the enterprise network or via an interface to enterprise telephone system 17 to the enterprise telephone system 44 by the employee. The web pages for changing preferences and/or locations 8 which interfaces 18 with the enterprise network 48 is expected to be primary for making changes.

The following software facilitates an employee's alteration of their schedule and preferences by altering their schedules using the corporate schedule organizer 49. As previously described in relation to FIG. 1, employees can access the employee schedule organizer 49 from their employee personal schedulers 52 or corporate employee workstations 51 via links with the enterprise network 48. Changes made to the employee scheduler database 50 by the employee using the employee schedule organizer 49 is monitored by the employee location monitor 7 which is linked to the employee schedule organizer 49 and employee scheduler database 50 through the employee location monitor 7 interface to enterprise LAN 18 link with the LAN. The employee location monitor 7 is a background process which continuously monitors the corporation scheduler database 50 (i.e., Lotus Notes™ and Meeting Maker™) to detect changes made to it. Upon detecting a change, employee location monitor 7 will determine if any change to the employee location database is required. If it is, the change will be made. If the change has no effect on the information in the recipient information and locations database 42, the change is ignored. An employee may choose to update the location information simply by updating the corporation scheduler program which allows the employee to bypass using the web pages for changing preferences and/or locations 8 or voice generation module 9 and voice translation or touch-tone translation module 10 to this system. An important part of this system is to periodically contact the employee schedule organizer 49 (via the enterprise network or by some other means) in order to determine if any relevant changes were made within the employee schedule database 50. Any changes detected will be handled according to rules established by this system's administrator. All exceptions will be reported to the administrator.

Locating Employees/Recipients for Delivery of a Message/Parcel:

All outside access to the system by employees not included in the system, or by people in the mail room, will be facilitated through the preference resolution and location finder module 11, which allows users to log in and find out the particular addresses or whereabouts of the desired person. This interface is also known as the "API" or Application Program Interface and is provided as a means for extension of the system for other purposes. This interface will also connect this system to a message delivery system such as the "I-Send" or "Digital Document Delivery" router by Pitney Bowes™, or systems from third-party vendors. In the case of an application accessing the database, the system will merge all preferences (business, sender and recipient) and provide a consolidated list of preferences so that the calling application need not do any additional preference resolution. Additionally, if the employee set up preferences for messages to "follow" them, preference resolution and location finder module 11 will indicate the employee's current location and where the employee is scheduled to be for the next hour. The preference resolution and location finder module 11 is in communication with the corporation preference and business rules database, employee general information and preference database and employee up-to-the-minute location database.

The API interface 19 will allow another application to communicate with this application via standard "C" calling conventions. A Java language API is also available for direct use by Java applications.

What is claimed is:

1. A method for locating a recipient of a message in a corporation using a computerized system, comprising:
    compiling on a computer a database of a recipient's scheduled location, a recipient's delivery preference, and a corporation's preference;
    receiving in a processing device connected to the database an updated scheduled location and/or delivery preference for entry in the database; and
    locating the recipient in response to a user inquiry to the system, comprising:
        generating in the processing device a merged preference set by merging the recipient's delivery preference and the corporation's preference; and
        providing to the user the updated scheduled location and the merged preference set to facilitate delivery of the message to the recipient at the updated scheduled location.

2. The method as claimed in claim 1, wherein the updated scheduled location is provided by the recipient.

3. The method as claimed in claim 1, wherein the updated scheduled location is received via a computer based network.

4. The method as claimed in claim 1, wherein the updated scheduled location is received via telephone.

5. A computer based system for locating a recipient of a message in a corporation, comprising:

a database containing a recipient's scheduled location, a recipient's delivery preference, and a corporation's preference, wherein the database is stored on a computer; and a processing device connected to the database for receiving an updated scheduled location and/or delivery preference for entry in the database, wherein, to locate the recipient in response to a user inquiry to the system, the processing device is configured to generate a merged preference set by merging the recipient's delivery preference and the corporation's preference, and to provide to the user the recipient's updated scheduled location and the merged preference set to facilitate delivery of the message to the recipient at the updated scheduled location.

6. The method of claim 1, wherein the message comprises a mailpiece.

7. The method of claim 6, further comprising delivering the mailpiece to the recipient at the updated scheduled location.

8. The system of claim 5, wherein the message comprises a mailpiece.

* * * * *